3,663,721
ELECTROCHEMICAL CELLS WITH
LITHIUM ANODE
Alain Blondel, Lillebonne, and Jean-Firmin Jammet,
Poitiers, France, assignors to Societe des Accumulateurs Fixes et de Traction (Societe Anonyme), Romainville, France
Filed July 31, 1970, Ser. No. 59,993
Claims priority, application France, Aug. 1, 1969, 6926543
Int. Cl. H01m 35/00, 21/00
U.S. Cl. 136—6
10 Claims

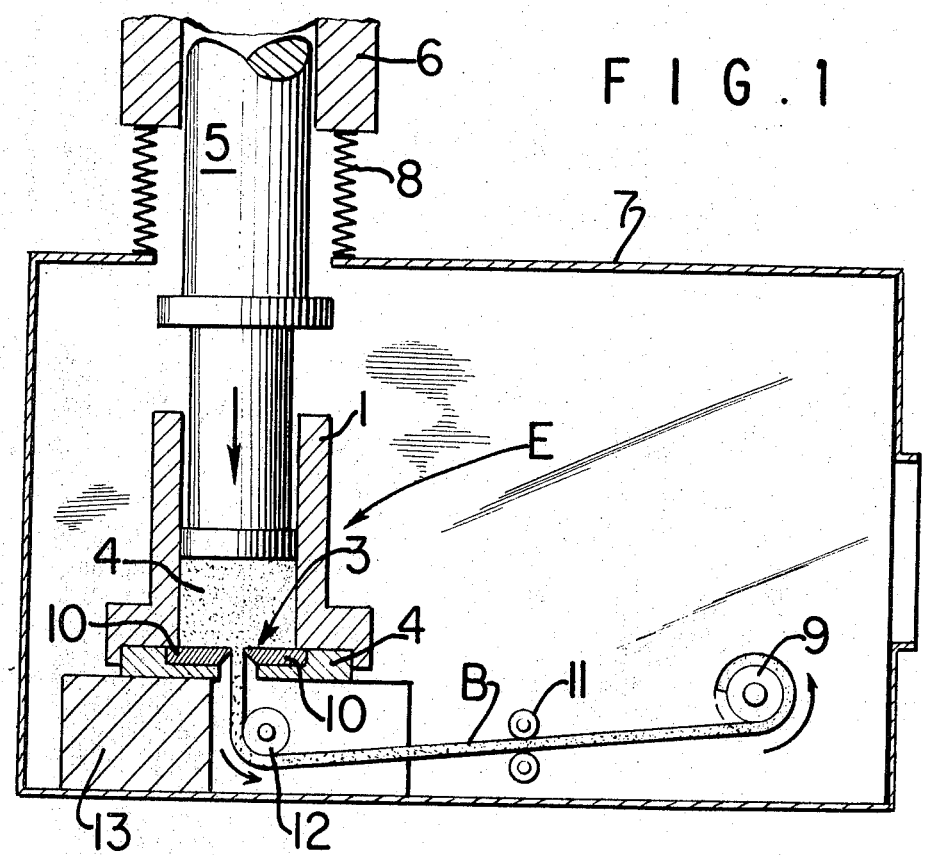
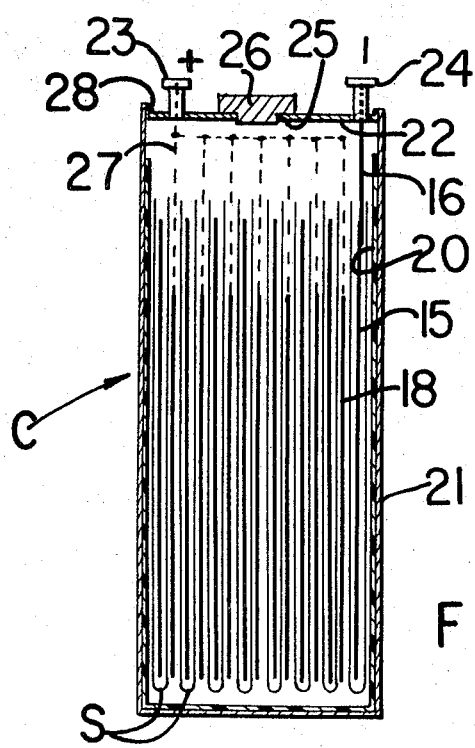

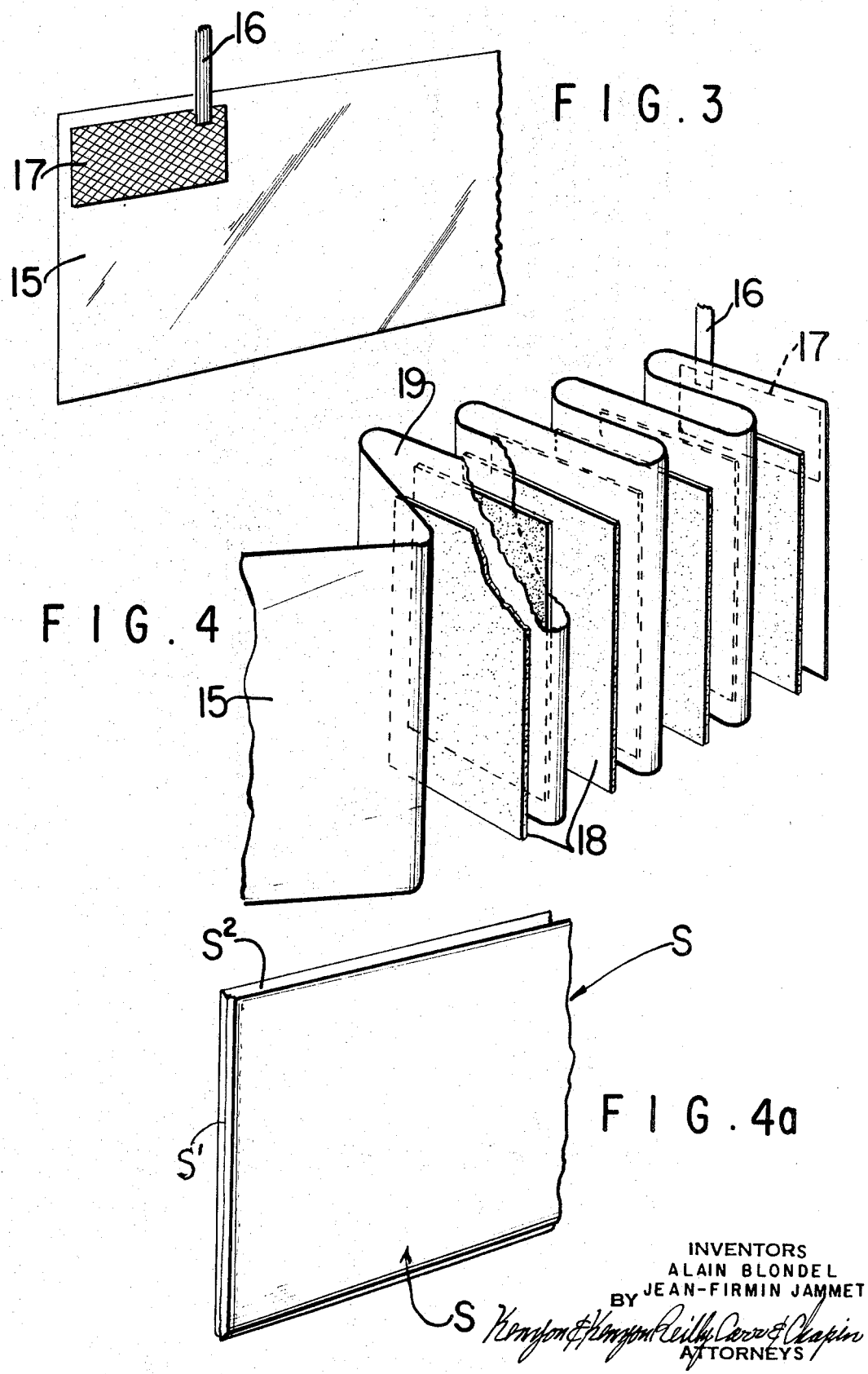

ABSTRACT OF THE DISCLOSURE

Electrochemical cells utilizing lithium anodes prepared by cold extrusion into sheet form. The extruded sheets are severed into prescribed band lengths and the bands are pleated in zig-zag form to provide multiple folds or pleats. Thin cathode plates are positioned between pleats, being insulated from the pleated lithium anode by suitable separating means. The dimension of the cathode plates parallel to the width of the bands is such as to leave a zone along at least one edge of the pleated anode band that has no opposite cathode plate counterpart. Electrical connections are secured to the pleated band in said zone and are in the form of tabs, for example, of stainless steel, spot welded to an expanded metal strip which latter in turn is fastened to said lithium anode band in said zone as by ultrasonic welding. The separating means may be in the form of an enclosing sheath or envelope of insulating material into which the lithium band is inserted prior to pleating or the cathode plates may be individually sheathed in separator material.

BRIEF SUMMARY OF INVENTION

This invention relates to electrochemical cells employing lithium anodes.

The cell according to the invention embodies a lithium anode in form of a lithium band zig-zag-wise folded or pleated several times upon itself, several thin cathode plates being placed in the pleats or folds thus created and being insulated from the said anode by suitable separating means, the dimension of each of the said cathode plates parallel to the width of the anode band being smaller than said width so that a zone stretching lengthwise along at least one edge of the pleated band has no opposite cathode counterpart, electrical connection means being fastened in the said zone to said anode band.

The lithium anode is advantageously obtained by cold extrusion of lithium to form sheets from which desired band lengths are severed.

According to a characteristic of the invention, the said electrical connection means are constituted by a tab, e.g. made of stainless steel, spot welded to an expanded metal strip, said strip being fastened in turn to the anode in said zone preferably by ultrasonic welding.

The cathode plates may embody cupric sulfide and be prepared according to the procedure of the French Pat. 1,490,725, filed on June 23, 1966 and entitled "Method of Making a Cupric Sulfide Electrode and Electrode Obtained Thereby" or according to a co-pending U.S. patent application Ser. No. 53,311 filed July 8, 1970 and entitled "Method of Preparation of Cupric Sulfide Electrodes for Electrochemical Cells and Resulting Electrodes."

According to a preferred feature and characteristic of the invention, the said separating means are in the form of a sheath or envelope of insulating material enclosing the anode, the latter being inserted into said sheath prior to pleating or zig-zag folding. In the alternative, the individual cathode plates may be sheathed by such separating means.

Other objects and features of the invention are the provision of simplified procedure for production of electrochemical cells of the type contemplated to enhance production rates as well as provide material savings in manufacturing costs.

Other characteristics, objects and features of the invention will become apparent in the following description and the annexed drawing in which:

FIG. 1 diagrammatically shows an apparatus for making the anodes;

FIG. 2 is a perspective view from above of a die part of an apparatus used for obtaining the lithium bands or sheets by cold extrusion;

FIG. 3 shows a fragmentary view of a lithium anode prior to folding or pleating provided with the electrical connection means;

FIG. 4a illustrates in perspective a fragmentary portion of a sheath or envelope of separating material into which the lithium anode band is inserted prior to its zig-zag folding or pleating;

FIG. 4 diagrammatically shows a perspective view with broken away portions of a part of the structure embodying the invention with one anode electrode and several cathode electrodes, the separating means between the electrodes and the electrical connection means associated with the cathodes not being shown, and FIG. 5 is a schematic partially sectionalized elevation of an assembled electrochemical cell embodying the lithium anode and cathode structure of this invention.

DETAILED DESCRIPTION

Referring to the drawings, the anode which is to be constituted by a zig-zag folded or pleated sheet of lithium is advantageously made by cold extrusion of a lithium ingot to form a lithium band by means of a suitable extruding apparatus E as diagrammatically shown in FIG. 1.

This apparatus E comprises a die holder or tube 1, a carrier 2 for the die holder 1 and the die-plates 3 as shown in FIG. 1. A lithium ingot 4 is placed in the die holder 1 and is pressed towards the die-plates 3 by means of a suitably operated extruding piston 5 guided in its movement by a guide member 6.

The extrusion operation on the lithium ingot 4 is carried out at ambient temperature and wholly under dry argon atmosphere in a hermetic container 7 so that the band B when issuing from the passage in die plate 3 remains clean on its surface. Bellows 8 connect the thermetic container 7 to the guide member 6 used for guiding the piston 5 which is operating for extrusion of band B.

The lithium band B issuing from the passage of the die plate 3 must be drawn in order to be kept straight upon its issuance. This problem is solved by a winch 9 whose wind-up is effected by suitable means (not shown).

Before wind-up the lithium band B passes through smoothing rollers 11, after changing its direction around a guiding roller 12. The extrusion apparatus rests on support 13. With an extrusion pressure of about 0.4 ton/cm.² it is possible to obtain a lithium band 61 mm. wide and about 1.2 mm. thick.

Die-plate 3 is obtained by assembling two half-dies parts 10 in the carrier 2, each half-die part 10 being similar to that shown in FIG. 2.

It should be noted that the outward and downward slant of the bevelled faces 10a and 10b of these half-die parts 10 is pronounced in order to prevent lithium from adhering to them. This kind of die part is provided with a slot 10c and in assembly the opposite faces of these slots are parallel with trued surfaces, defining the orifice of die 3.

The extruded lithium band B subsequent to wind-up is unrolled from winch 9 and is then cut to the desired plate length for making an anode plate 15 (FIG. 3).

Electrical connection means 16 and 17 are then fastened to edge zones of the anode plate 15, FIG. .3.

In this example, these means comprise a stainless steel tab 16 having the shape of a grid for lightness sake, which is spot-welded to an expanded metal strip 17 made e.g. of stainless steel.

The fastening of said strip 17 to the edge zone of the anode plate 15 is effected by ultra-sonic welding of the said strip 17 to one edge zone of the lithium plate 15. For this purpose, the said edge of the plate 15 is placed on the anvil of an ultra-sonic welding machine (not shown).

Ultra-high frequency sounds are directed to the strip 17 and anode plate 15 for a time which depends on the strip surface area (about 6 seconds for 8 cm.$^2$) at a power of about 1000 watts.

This ultra-sonic welding is also carried out in a dry argon atmosphere.

For a correct application of the above-described process it is necessary that:

the lithium surface of plate 15 be very clean (therefore the welding apparatus is maintained in a dry argon atmosphere);
the anvil be made of trued tempered steel so that lithium is not welded to the anvil;
the titanium sonotrode (not shown) must be covered e.g. by a polyethylene terephthalate sheet to prevent lithium from being welded to titanium of the sonotrode;
the thickness of the lithium plate should be at least equal to 0.6 mm.

An anode 15 according to the invention is shown in FIG. 3, being provided with its electrical connection means 16 and 17.

The lithium anode 15 bears the stainless steel tab 16 spot welded to strip 17 made of an expanded metal such as stainless steel and said strip 17 itself welded by ultrasonic welding to anode 15.

Upon completion of attachment of the electrical connecting means 16, 17 to said anode 15, a separator is then placed around the anode. According to the invention, this separator S (FIG. 4a) constitutes a sheath obtained by lengthwise folding of a sheet, for example, made of polypropylene felt or the like, and by heat welding the opposite end edges of the sheet as at $S^1$.

Advantageously this sheet is teaseled on its external faces which are not to be in contact with the anode.

The lithium anode 15 provided with its electrical connection means is slipped into the separator sheath through its open mouth $S^2$. Then the assembled anode and sheath are zig-zag-wise folded or pleated on a master gauge and cathode plates are placed between the adjacent pleats resulting from the zig-zag folding as illustrated in FIG. 4.

FIG. 4 diagrammatically shows a perspective view with broken-away portions of part of the unit of anode and cathode plates; however, the sheath shaped separator S enclosing the anode 15 and the electrical connection means associated with the cathodes have not been shown in this figure for clarity's sake.

The anode 15 provided with its electrical connection means 16, 17 is made by folding or pleating the plate 15 of FIG. 3 enveloped in sheath S upon itself. Between each pair of pleats is placed a cathode plate 18 having the shape of a thin substantially rectangular plate. A cell may thus be constituted by folding the anode eight times in order to constitute seven folds and placing seven cathode plates in the pleats between these folds.

According to the invention as seen in FIG. 4, the height of the cathode plates 18 is smaller than the width of anode 15. Thus, a longitudinal zone 19 is created along the upper edge of anode 15, such zone being without opposite cathode surface and therefore not being electrochemically operative.

According to the invention, the electrode connection means 16, 17 are fastened on the anode in the said zone 19. Thus, current is correctly collected until the end of the discharge.

As an illustration, the width of band 15 being 61 mm., the width of zone 19 may be from 5 to 10 mm.

This assembly is introduced into a pocket 20, FIG. 5, made of insulating material such as polyethylene, which is then placed in a metal casing 21, e.g., made of tin plated iron sheet. The said pocket 20 is mainly used for insulating the electrodes 15 and 18 from the metal casing 21. The cover 22 of the casing is provided with positive and negative terminal posts 23 and 24 and with a perforation 25 used for pouring the electrolyte in the casing, which can be hermetically closed as by a plug 26.

The connections 27 of the cathode plates and the connecting tab 16 of the anode 15 are respectively welded to the positive and negative terminal posts 24 and 23 of the cover 22. Such assembly operations are carried out in a closed container under a dry air flow.

The cells C thus constituted prior to joining of the cover 22 to casing 21 are placed in vacuo and then under an argon atomsphere prior to soldering at 28 of the cover 22 to the casing 21, e.g. by tin soldering.

Due to the fact that the cell C comprises only one anode 15 made of a folded length of lithium band instead of several distinct anode plates, time is gained in the manufacture of the cell since only one electrical connection is to be welded for collecting the current of the lithium electrode 15.

It has been hereabove said that the separating means S between the anode 15 and the cathode 18 plates are constituted by a sheath enclosing the anode 15, but instead of this one sheath, several independent sheaths enclosing each of the respective cathode plates could be utilized.

The electrolyte for cell C may be constituted, for example, by a lithium perchlorate solution in a mixture of tetrahydrofuran and 1,2-dimethoxyethane. It must necessarily be free from any trace of water.

As an illustration this electrolyte may have the following composition by volume.

| | Percent |
|---|---|
| Tetrahydrofuran | 62 |
| 1,2-dimethoxyethane | 27 |
| Lithium perchlorate | 11 |

It is well understood that the invention is in no way limited to the described embodiment which has been given solely as an example. More particularly, without departing from the scope of the appended claims, it is possible to modify details, change some dispositions or replace some means by equivalent means. There is no intention of limitation to the exact disclosure or abstract herein presented.

What is claimed is:

1. An electrochemical cell comprising a single lithium anode electrode, separator means, separate cathode plate electrodes and electrolyte, said lithium anode electrode comprising a unitary length of zig-zag pleated lithium, of selected width, individuals of said cathode plate electrodes being positioned respectively between pairs of pleats of said zig-zag pleated anode electrode, said separating means insulating the cathode plate electrodes from the anode electrode, each of said cathode plate electrodes being of smaller dimensions than the width of said anode electrodes and positioned between said pleats to provide a continuous zone proximate an edge of said anode electrode having no oppositely facing cathode electrode plates thereat, and electrical connection means secured to said anode in said zone.

2. An electrochemical cell according to claim 1, including a casing, a cover therefor, terminals positioned on said cover and connected respectively to said anode connection means and to said cathode plate electrodes.

3. An electrochemical cell according to claim 1, wherein said electrical connection means comprise a metallic tab, and an expanded metal strip, said tab being spot welded to said strip and said strip being welded ultrasonically to said anode electrode in said zone thereof.

4. An electrochemical cell according to claim 1, wherein said separating means comprises an enveloping sheath of insulating material for said anode electrode.

5. An electrochemical cell according to claim 4, wherein said sheath envelops the anode and is zig-zag pleated together with the anode electrode.

6. An electrochemical cell according to claim 4 wherein said sheath is of propylene felt teaseled on its external surfaces.

7. An electrochemical cell according to claim 1 including a pocket of insulating material, a metallic casing in which said pocket, said anode electrode, said cathode plate electrodes, said separator means and electrolyte are enclosed, and a cover for said casing.

8. An electrochemical cell according to claim 7 wherein said cover has a sealable opening for introduction into the casing of said electrolyte, and cell terminal posts mounted on said cover.

9. An electrochemical cell according to claim 1 wherein said cathode electrode plates comprise cupric sulfide.

10. An electrochemical cell according to claim 1 wherein said electrolyte is non-aqueous comprising a solution of lithium perchlorate, tetrahydrofuran and 1,2-dimethoxyethane.

References Cited
UNITED STATES PATENTS

| | | | |
|---|---|---|---|
| 3,423,242 | 1/1969 | Meyers et al. | 136—6 |
| 3,350,239 | 10/1967 | Stanimirovitch | 136—176 |
| 3,216,864 | 11/1965 | Bushrod et al. | 136—148 |
| 3,030,400 | 4/1962 | Giraitis | 136—83 X |
| 2,647,157 | 7/1953 | Booth | 136—147 |
| 2,851,509 | 9/1958 | Pasquale et al. | 136—6 |
| 2,928,888 | 3/1960 | Vogt | 136—6 |
| 3,216,859 | 11/1965 | Duncan | 136—6 |
| 3,415,687 | 12/1968 | Methlie | 136—100 |

ANTHONY SKAPARS, Primary Examiner

U.S. Cl. X.R.

136—83 R, 111, 175